Figure 1:
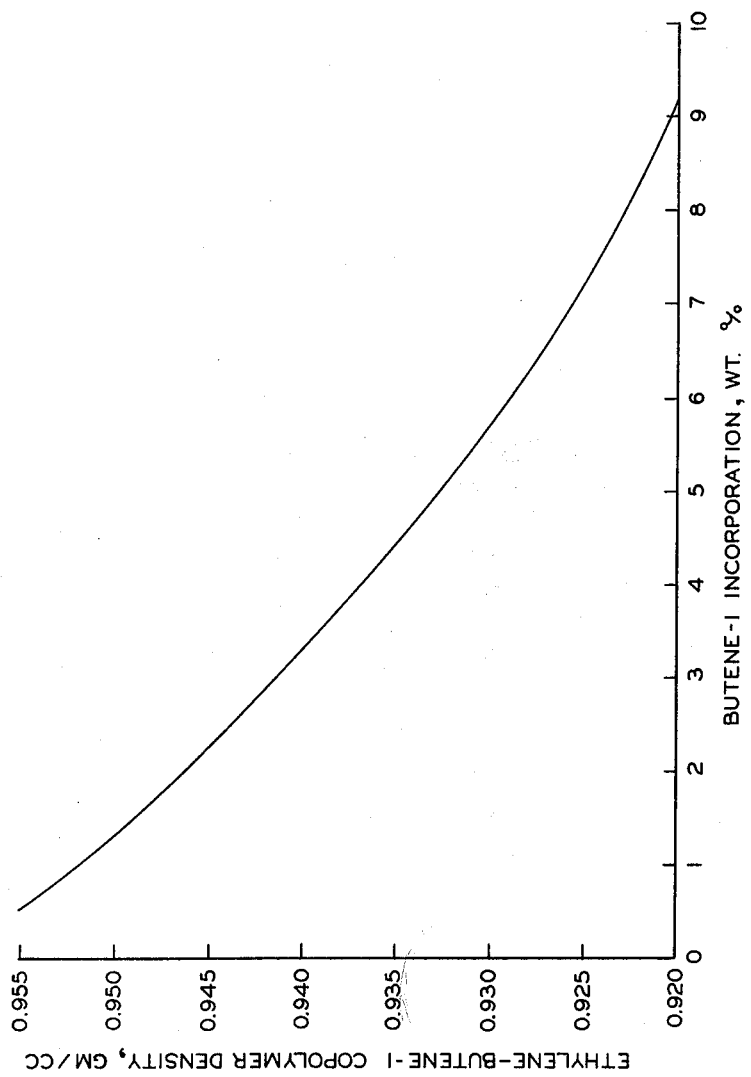

April 6, 1965 J. E. COTTLE 3,177,184
METHOD FOR CONTROLLING THE POLYMER PRODUCTION RATE
OF COPOLYMERS OF ETHYLENE WITH HIGHER OLEFINS
Filed Feb. 16, 1961 2 Sheets-Sheet 1

INVENTOR.
J. E. COTTLE

BY *Hudson & Young*

ATTORNEYS

INVENTOR.
J. E. COTTLE
BY Hudson & Young
ATTORNEYS

United States Patent Office 3,177,184
Patented Apr. 6, 1965

3,177,184
METHOD FOR CONTROLLING THE POLYMER PRODUCTION RATE OF COPOLYMERS OF ETHYLENE WITH HIGHER OLEFINS
John E. Cottle, Bartlesville, Okla., assignor to Phillips Petroleum Company, a corporation of Delaware
Filed Feb. 16, 1961, Ser. No. 89,741
15 Claims. (Cl. 260—88.2)

This invention relates to the copolymerization of ethylene with higher olefins. In one aspect this invention relates to the controlling of the polymerization of ethylene with higher olefins.

In another aspect this invention relates to a method for controlling the polymerization rate in the copolymerization of ethylene with at least one other olefin having from 3 to 8 carbon atoms per molecule.

It is known in the art that monoolefins having from 2 to 8 carbon atoms per molecule and no chain branching nearer the double bond than the 4-position can be polymerized in the presence of a catalyst containing chromium oxide, at least a portion of the chromium being in the hexavalent state, to high molecular weight polymers. Such a process is described in detail in the patent to J. P. Hogen et al., U.S. 2,825,721, issued March 4, 1958. In the continuous process the reaction can be carried out in solution employing a hydrocarbon diluent and introducing the catalyst to the reactor in the form of a slurry. Ethylene is flashed from the reactor effluent and the solution is filtered to remove solid catalyst. Polymer is then recovered from the solution.

Recently it has been discovered that there is a critical polymerization temperature range within the broad range disclosed by Hogan et al. in which it is possible to produce increased yields of high molecular weight polymers of ethylene which are insoluble in the hydrocarbon diluent. This polymer is formed in association with the polymerization catalyst and is suspended in the liquid diluent in solid particle form. The preparation of insoluble particle form polymer is disclosed in the copending application of Leatherman et al., Serial No. 590,567, filed June 11, 1956 and now abandoned. In the following discussion the term "particle form polymer" refers to the insoluble polymers of ethylene formed in accordance with the Leatherman et al. application.

In the past, when copolymerizing ethylene with higher olefins it has been difficult to control the polymerization so as to provide a highly uniform product. In general, it has been found that the control of the polymerization production rate at a substantially uniform rate is an important factor in the control of the quality of the product obtained. When a variation in the activity of the catalyst occurs the production rate varies, resulting in an increase or decrease in the amount of higher olefin incorporated into the final product along with the ethylene. The amount of higher olefin in the final product influences greatly such important properties as density, melt index and other physical properties. The above-described effects are not readily apparent in the formation of ethylene homopolymer but appear to be peculiar to the copolymerization of ethylene with higher olefins.

It is an object of this invention to provide an improved method for copolymerization ethylene with higher olefins. It is another object of this invention to provide a method for controlling the copolymerization of ethylene with higher olefins. It is yet another object of this invention to provide a method for controlling the quality of the polymer product obtained in an ethylene copolymerization process. Other objects and advantages and features of this invention will be apparent to those skilled in the art from the following specification, claims and drawings.

It is well known in the art that catalysts active for the copolymerization of ethylene with higher olefins are sensitive to certain materials, referred to herein as catalyst deactivating agents, which generally effect unfavorably the activity of said catalyst for the polymerization of said monomers. This effect on activity is generally manifested by a decrease in the amount of product which can be obtained per pound of catalyst introduced into the system.

These objects are broadly accomplished in a process for copolymerizing ethylene with a 1-olefin in a polymerization zone in the presence of a catalyst active for such polymerization, said catalyst's activity being altered when contacted with a deactivating agent therefor, by the improvement which comprises varying the amount of said agent introduced into the polymerization zone as the rate of polymer production changes.

In one aspect of this invention the polymer production rate is determined by measuring the amount of heat released by the exothermic polymerization reaction per unit time.

In still another aspect of the invention the amount of catalyst introduced into the polymerization zone is varied when the deactivating agent addition rate to said zone attains a predetermined value.

In its broad aspect this invention is concerned with the copolymerization of ethylene and at least one other olefin, most frequently a 1-olefin having from 3 to 8 carbon atoms per molecule and no chain branching nearer the double bond than the 4-position. Examples of olefins which are copolymerizable with ethylene include propylene, 1-butene, 1-pentene, and 1-hexene. This invention is especially advantageous in the copolymerization of ethylene and 1-butene.

The catalysts to which my invention applies include those described in the above-mentioned patent to J. P. Hogan et al. These catalysts comprise chromium oxide containing hexavalent chromium and silica, alumina, thoria, zirconia or composites thereof and can be prepared by impregnating the carrier material with aqueous solutions of salts of chromium. The catalyst can then be dried and activated at a temperature in the range of 450 to 1500° F. preferably under non-reducing conditions for several hours. The hexavalent chromium content of the activated catalyst should be at least 0.1 percent by weight. My invention also applies to polymerization reactions employing an ethylene feed and a mixed catalyst of chromium oxide and nickel oxide or cobalt oxide supported on a suitable carrier such as silica, alumina, thoria, zirconia or composites thereof.

Suitable diluents are paraffins having about 3 to 12 carbon atoms per molecule such as propane, isobutane, n-pentane, isopentane, isooctane, decane, dodecane, and the like. Preferably those paraffins having at least 5 carbon atoms per molecule are used. The cycloparaffins, such as cyclohexane and methyl cyclohexane, are also suitable. In addition to the foregoing, other hydrocarbon diluents which are relatively inert and in the liquid state under the reaction conditions can be employed. In general, the quantity of the diluent is relatively large in relation to the olefin feed. For example, the olefin feed usually constitutes about 0.1 to about 25 percent by weight of the mixture.

In the formation of copolymer having highly desirable properties, the amount of comonomer in the reaction mixture ranges from 1 to 30 weight percent of the total monomer and is preferably between about 3 to 15 weight percent. Although higher olefins are usable it is preferred to copolymerize ethylene with either propylene or 1-butene. The amount of comonomer incorporated into the polymer is generally less, approximately one-third, than that employed in the monomer mixture in the reactor. The preferred copolymers usually contain about 1 weight percent to about 8 weight percent of the higher comonomer based on the total olefin content of the polymer.

Although this invention is generally described herein using a simplified version of a solution-type reactor, it is to be understood that this invention is applicable to many types of reactors including the continuous path reactor although somewhat different polymerization conditions may be required. However, to simplify the description of the invention, the description herein is generally limited to a discussion of solution-type polymerization of ethylene with 1-butene.

A number of catalyst deactivation agents are employable. Generally, compounds are not preferred which introduce an odor or color problem in the final product although they are effective in the method of this invention. Water has been found to be an excellent deactivating agent for use in my invention and is effective in amounts of 50 parts per million, preferably less than 10 parts per million, to reduce the polymerization rate by at least 50 percent. Another agent which I have found highly suitable is an antioxidant, 4,4'-thio-bis(6-tert-butyl-m-cresol). This antioxidant is as effective as water and serves another useful purpose since it remains in the polymer and assists in the protection of the polymer from oxidative degradation. Another deactivating agent which is preferred is methyl Carbitol. This compound is effective in concentrations of the same magnitude as those above described for water and furthermore has a low vapor pressure so it does not carry overhead with the recycle olefins. Methyl Carbitol is soluble in cold cyclohexane which can be used as the addition vehicle and it does not effect the color or the properties of the polymer. Most compounds of sulfur, of oxygen, of nitrogen, and of halogens act as deactivating agents for the catalyst described in Hogan et al., supra. The amount of catalyst deactivating agent required to reduce the activity of the catalyst for the polymerization of ethylene with higher olefins depends, inter alia, upon the particular catalyst used, the reaction conditions, and the decrease in temperature of reaction required. The amount of deactivating agent required to reduce the activity of the catalyst for the polymerization of ethylene with 1-butene, for instance, can vary from a few parts per million, such as 10 for a material such as water, to as high as several thousand, such as 12,000 for a material such as $CO_2$. Examples of known catalyst deactivating agents include but are not necessarily limited to the following: oxygen, carbon monoxide, dimethylformamide, ethyl ether, acetone, ethyl alcohol, diethyl sulfide, isobutyl-mercaptan, ammonia, carbon tetrachloride, normal butyl chloride, secondary butyl chloride, and the like.

Generally, the effect of the addition of the deactivating agent to the polymerization zone is to decrease the activity of the catalyst for the copolymerization of ethylene with the higher olefin which in turn materially effects the polymer production rate and thus the rate at which heat is released, which is an indirect measure of the reaction rate. One method of determining the rate at which heat is released by the reaction itself is to compute a heat balance on the reactor system, algebraically summing the heat gained and lost, and thus determine the heat of reaction by difference. This heat release measurement is then used as a means of indicating when adjustment in the rate of deactivating agent addition is required. For instance, when the rate at which heat is released by the reaction increases, more agent is added, and vice versa. Other methods of determining polymerization rate are also within the scope of my invention.

One proposed explanation of the effect of the deactivating agent upon the ultimate manifested physical properties of the polymer is that the deactivating agent decreases the catalyst's activity for butene-1 polymerization more than for the polymerization of ethylene. Therefore, since less butene-1 is polymerized, the exothermic reaction will release less heat, thereby decreasing the temperature of the reaction. In turn, the decrease in polymerization of butene-1 and the resulting decrease in incorporation of butene-1 in the ultimate copolymer results in an increased density of the copolymer. It is known to those skilled in the art that the higher the ratio of butene-1 or other higher olefin incorporated in the copolymer with ethylene, the lower the density and the melt index. This relationship between butene-1 incorporation and density is graphically illustrated in FIGURE 1. Therefore, it will be readily apparent that if the reaction rate can be maintained substantially constant the ratio of monomers in the product, and thus the ultimate physical properties of the polymer, will be substantially constant. However, this invention is not to be limited by any theory attempting to explain the mechanism involved in this discovery.

Figure 2:
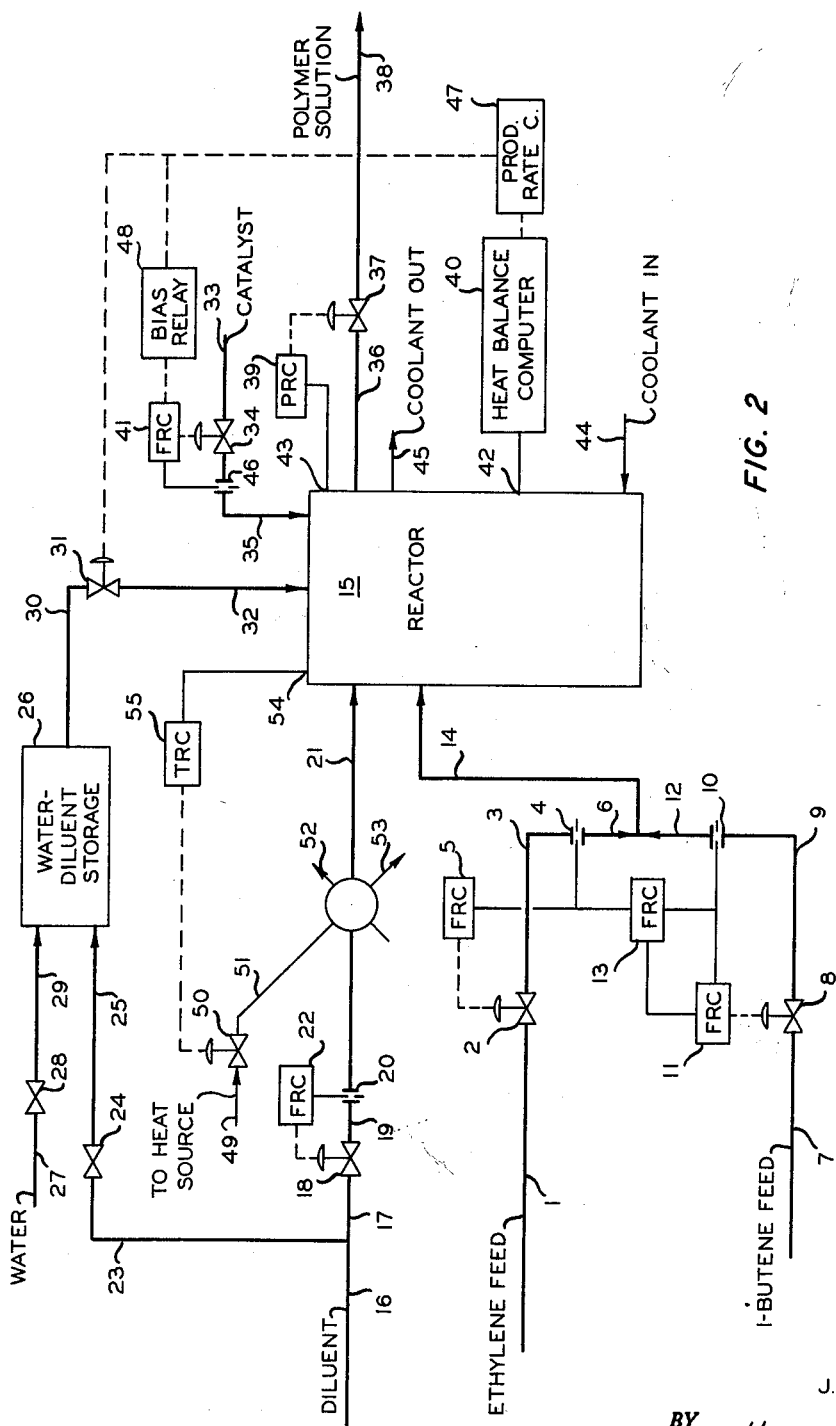

The invention will now be described by reference to FIGURE 2. For purposes of simplification FIGURE 2 will be described with reference to the utilization of particular materials and a particular type of reactor system but should not be limited to the use of these materials or systems.

Ethylene is introduced into the system through conduit 1, valve 2, conduit 3, flow sensing means 4, conduits 6 and 14 into the reactor 15. The butene-1 feed is introduced into the system through conduit 7, valve 8, conduit 9, flow sensing means 10, conduits 12 and 14 into the reactor 15. The flow rate of the ethylene is controlled by flow recorder controller 5 which receives a signal from a flow measuring device in conduit 3, such as orifice 4, and actuates motor valve 2 in response to said signal to control the flow rate of ethylene being introduced into the system at the preset value. Flow recorder controller 11 controls the butene feed in the same manner as the flow recorder controller 5 does for the ethylene feed. A signal is received from flow measuring means 10 and motor valve 8 is actuated in response to said signal to control the flow of butene feed at a preset value. Flow ratio recorder controller 13, disposed intermediate flow recorder controllers 5 and 11, continually adjusts the preset value on flow recorder controller 11 to maintain the ratio of ethylene and butene-1 at a value preset on flow ratio recorder controller 13.

The reactor 15 is cooled by any convenient means, such as cooling jacket, or by cooling coils (not shown). The coolant enters conduit 44, travels through the coils and exits through conduit 45 so as to remove a substantially constant amount of heat from the reactor. The system shown illustrates the utilization of the invention for solution polymerization. It will be readily understood by those skilled in the art that the invention is applicable also to the utilization of other types of reactors such as a continuous path loop reactor.

Catalyst, preferably as a slurry in the diluent used in the reaction zone, is introduced into the reactor 15 through conduit 33, valve 34, flow sensing means 46, and conduit 35. Valve 34 is usually preset so as to introduce a predetermined amount of catalyst to the reactor. Alternatively, the flow rate of catalyst is controlled by a flow recorder controller 41 which receives the signal from a flow sensing means 46 and actuates motor valve 34 in response to said signal to maintain a substantially constant flow of catalyst into reactor.

Diluent, such as n-pentane, is introduced into the reactor 15 (from a source not shown) into conduits 16, 17, valve 18, conduit 19, flow sensing means 20, heat exchange means 52, and conduit 21. Preferably the amount of diluent introduced into the reactor is maintained at a substantially constant rate by a flow control means, such as flow recorder controller 22, which receives a signal from flow sensing means 20 and actuates motor valve 18 in response to said signal to maintain a substantially constant flow of diluent into the reactor.

A portion of the diluent from conduit 16 is diverted into conduit 23, through valve 24 and conduit 25 into storage tank 26. Storage tank 26 contains a mixture of diluent and catalyst deactivating agent, such as water introduced through conduit 27, valve 28 and conduit 29. The concentration of catalyst deactivating agent in storage tank 26 is maintained at a substantially constant level so that a known quantity of deactivating agent may be removed from storage tank 26 through conduit 30, valve 31 and conduit 32 into the reactor. Although this invention is described herein by adding the deactivating agent to the diluent, it will be readily understood by those skilled in the art that the agent may be added in conjunction with the olefin or catalyst feed or by direct addition to the reactor or by any other suitable method. A very satisfactory method for determining the need for the introduction of deactivating agent into the reactor is by measuring the rate at which polymer is produced by using a heat balance computer disclosed in the copending application of Berger and Atkinson, Serial No. 683,662, filed September 12, 1957, now U.S. Patent 3,078,265. In this copending application a method and apparatus are described for determining the over-all heat balance of the reactor system. This plurality of measurements of flow rates, temperatures, etc., as represented by sensing means 42, is then transmitted into a heat balance computer 40 which determines the over-all heat balance of the system taking into consideration the above measurements which include such factors as reaction temperature, radiation loss, diluent feed temperature, olefin feed temperature, catalyst feed temperature, loss to coolant, and the like. This signal from computer 40 is then transmitted to production recorder controller 47 which actuates motor valve 31 to control the inroduction of the deactivating agent through conduit 32 into reactor 15. For instance, when the rate at which heat is released by the reaction increases as determined by the computer 40, the controller 47 receives a signal and in turn further opens valve 31 to increase the amount of deactivating agent introduced to the reactor.

In one embodiment of this invention provision is made for also adjusting the quantity of catalyst introduced into the reactor. It will be readily apparent by those skilled in the art that it is possible for the activity of the catalyst to decrease to the point that even if the quantity of deactivating agent introduced into the reactor is reduced to a predetermined low value, even zero, that a further decrease in polymer production rate will occur. Therefore, when the polymer production rate decreases as determined by computer 40, controller 47 transmits a signal to bias relay 48 and valve 31. Bias relay 48 is preset so as not to manipulate the set point of FRC 41 until the valve 31 has been closed to a predetermined flow rate, possibly zero. When valve 31 reaches this point the bias relay 48 permits the signal from controller 47 to manipulate the set point of flow rate controller 41 so as to further open valve 34 thereby increasing the catalyst addition rate as measured by transducer 46 until the reaction rate again attains the desired level. In summary, the catalyst addition rate is not varied unless corrective action cannot be accomplished by means of deactivating agent addition alone.

It is usually desirable to provide a separate means for controlling the temperature of the reaction mixture such as cooling by indirect heat exchange. A satisfactory method of further controlling the reaction temperature is by adjusting the temperature of the incoming diluent by heater 52 which is heated by a heat exchange fluid, such as steam (from a source not shown) introduced through conduit 49, valve 50, conduit 51 into heater 52 and removed through conduit 53. A signal is transmitted from temperature sensing means 54 to temperature recorder controller 55 which actuates motor valve 50 in response to said signal to assist in controlling the temperature of the reaction mixture.

In the type of reactor illustrated by the drawing, the amount of polymer solution withdrawn from the reactor 15 through conduit 36, valve 37 and conduit 38 to a polymer recovery zone will be substantially constant. One means of controliing the polymer solution withdrawal rate substantially constant is by means of pressure recorder controller 39 which receives a signal from pressure measuring means 43 and actuates motor valve 37 in response to said signal to maintain the polymer solution withdrawal rate at a substantially constant value.

As an example of the manner in which my invention serves to provide uniform polymerization zone conditions, and thus uniform polymer quality, the following specific example is presented.

EXAMPLE

Ethylene and 1-butene are copolymerized in cyclohexane diluent in the presence of a chromium oxide catalyst (2.5 weight percent chromium on a 90/10 silica/alumina support) activated by the method of Hogan et al., supra. The reactor system and auxiliary equipment is that shown in FIGURE 3 of the drawing. The system is lined out at the following conditions (numbers in parenthesis are reference numerals in FIGURE 3):

A. Operating conditions:

Reactor temperature (54) _____ 267° F.
Reactor pressure (43) _____ 315 p.s.i.a.

B. Initial material balance (lbs./hr.):

| Stream | (36) | (14) | (32) | (21) | (35) |
|---|---|---|---|---|---|
| Material: | | | | | |
| Ethylene | 28 | 97.16 | | | |
| Butene-1 | 6.47 | 7.31 | | | |
| Cyclohexane | 1,000 | | 10 | 990 | |
| Catalyst | 0.212 | | | | 0.212 |
| Water | Trace | | 0.006 | | |
| Copolymer | 70.06 | | | | |
| | 1,104.688 | 104.47 | 10.006 | 990 | 0.212 |

Polymer properties:
    Melt index _____ 1.0.
    Density _____ 0.951 gm./cc.
    Catalyst productivity __ 330 lbs. copolymer per lb. catalyst.

C. Intermediate material balance.—The amount of extraneous deactivating agents within the reactor decreases so that the conditions change as follows:

| Stream | (36) | (14) | (32) | (21) | (35) |
|---|---|---|---|---|---|
| Material: | | | | | |
| Ethylene | 28 | 155.92 | | | |
| Butene-1 | 9.72 | 11.80 | | | |
| Cyclohexane | 1,000 | | 10 | 990 | |
| Catalyst | 0.212 | | | | 0.212 |
| Water | Trace | | .006 | | |
| Copolymer | 130.006 | | | | |
| | 1,167.938 | 167.72 | 10.006 | 990 | 0.212 |

Polymer properties:
    Melt index _____ 1.1.
    Density _____ 0.948 gm./cc.
    Catalyst productivity __ 613 lbs. copolymer per lb. catalyst.

It is noted that the productivity almost doubles thereby significantly increasing the amount of butene-1 incorporated into the copolymer thereby affecting melt index and density.

D. Material balance after water addition.—The sensing means 42 measures these changes and the heat balance computer 40 measures change in over-all heat balance and controller 47 determines that an addition is needed through conduit 32. After this change has been transmitted to motor valve 31 the conditions are as follows:

| Stream | (36) | (14) | (32) | (21) | (35) |
|---|---|---|---|---|---|
| Material: | | | | | |
| Ethylene | 28 | 97.16 | | | |
| Butene-1 | 6.47 | 7.31 | | | |
| Cyclohexane | 1,000 | | 100 | 900 | |
| Catalyst | 0.212 | | | | 0.212 |
| Water | Trace | | 0.06 | | |
| Copolymer | 20.06 | | | | |
| | 1,104.742 | 104.47 | 100.06 | 900 | 0.212 |

Polymer properties:
 Melt index _____ 1.0.
 Density _____ 0.951.
 Catalyst productivity __ 330 lbs. copolymer per lb. catalyst.

Density as used herein is determined by compression molding a slab of the polymer, cooling said molding at a temperature reduction rate of 15 to 20° F. per minute to room temperature, cutting a pea-sized specimen therefrom, and placing said specimen in a 50-ml. glass-stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73 to 78° F., the balance is adjusted until the pointer is at zero. The value shown on the scale is taken as the specific gravity.

For melt index, the method of ASTM D-1238-52T is used with five runs being run at 2-minute intervals, averaging the five weights, discarding any values which deviate from the average by more than 5 weight percent, reaveraging and multiplying by 5 to obtain the amount of extrudate in 10 minutes. If the melt index is low, such as less than 1.0, the High Load Melt Index may be obtained by ASTM D-1238-57T (Procedure 5) using a weight of 21,600 grams.

While certain examples, structures, composition and process steps have been described for purposes of illustration, the invention is not limited to these. Variation and modification within the scope of the disclosure and the claims can readily be effected by those skilled in the art.

What I claim is:

1. In a process for copolymerizing ethylene in a polymerization zone with a higher 1-olefin in the presence of a catalyst containing chromium oxide active for such polymerization, the activity of said catalyst being decreased when contacted with a deactivating agent therefor, the improvement which comprises measuring the polymer production rate, introducing said deactivating agent into said zone in controlled amounts and varying the amount of said deactivating agent introduced to said zone as the polymer production rate changes so as to adjust said rate by increasing the amount of said deactivating agent introduced into said zone as the production rate increases and decreasing the amount of said deactivating agent introduced into said zone as the production rate decreases.

2. The process of claim 1 wherein said higher 1-olefin comprises butene-1.

3. The process of claim 1 wherein said deactivating agent comprises water.

4. The process of claim 1 wherein said polymer production rate is determined by measuring the amount of heat released by the reaction per unit time.

5. The process of claim 1 wherein the amount of catalyst introduced to said polymerization zone is adjusted when the production rate attains a predetermined value.

6. In a process for copolymerizing ethylene in a polymerization zone with a 1-olefin having from 3 to 8 carbon atoms per molecule in the presence of a catalyst containing chromium oxide active for such polymerization, the activity of said catalyst being decreased when contacted with a deactivating agent selected from the group consisting of oxygen, carbon monoxide, dimethylformamide, ethyl ether, acetone, ethyl alcohol, diethyl sulfide, isobutyl mercaptan, ammonia, carbon tetrachloride, normal butyl chloride, and secondary butyl chloride, the improvement which comprises measuring the polymer production rate, introducing said deactivating agent into said zone in controlled amounts and varying the amount of said deactivating agent introduced to said zone as the polymer production rate changes to control said rate by increasing the amount of said deactivating agent introduced into said zone as the production rate increases and decreasing the amount of said deactivating agent introduced into said zone as the production rate decreases.

7. A process for controlling the copolymerization of ethylene and a 1-olefin having from 3 to 8 carbon atoms per molecule and no chain branching nearer the double bond than the 4-position in a polymerization zone in the presence of a liquid hydrocarbon diluent and in the presence of a catalyst containing chromium oxide active for such polymerization, the activity of said catalyst being decreased when contacted with a deactivating agent, which comprises introducing said deactivating agent into said zone in controlled amounts and varying the amount of said deactivating agent introduced to said zone proportional to the polymer production rate thereby maintaining said rate substantially constant.

8. The process of claim 7 wherein said rate is determined by measuring the amount of heat released by the reaction per unit time.

9. The process of claim 7 wherein said deactivating agent comprises water.

10. The process of claim 7 wherein said deactivating agent comprises an alcohol.

11. A process for controlling the copolymerization of a monomer system containing ethylene and a comonomer selected from the group consisting of propylene and 1-butene in a polymerization zone in the presence of a hydrocarbon diluent and a catalyst containing chromium oxide active for such polymerization, the amount of ethylene in said monomer system being in the range of 70 to 99 weight percent, the activity of said catalyst being decreased when contacted with a deactivating agent therefor, which comprises introducing said deactivating agent into said zone in controlled amounts and varying the amount of said deactivating agent introduced to said zone proportional to the polymer production rate thereby maintaining said rate substantially constant.

12. The process of claim 11 wherein said rate is determined by measuring the amount of heat released by the reaction per unit time.

13. The process of claim 11 wherein said deactivating agent comprises water.

14. The process of claim 11 wherein said deactivating agent comprises an alcohol.

15. The process of claim 11 wherein the amount of catalyst introduced to said polymerization zone is increased when the corrective action cannot be accomplished by means of deactivating agent addition alone.

References Cited by the Examiner

UNITED STATES PATENTS

| | | | |
|---|---|---|---|
| 2,825,721 | 3/58 | Hogan et al. | 260—88.1 |
| 2,845,414 | 7/58 | Schutze | 260—94.9 |
| 2,910,461 | 10/59 | Nowlin et al. | 260—94.9 |
| 2,984,658 | 5/61 | Seydel | 260—94.9 |

JOSEPH L. SCHOFER, *Primary Examiner.*

M. LIEBMAN, WILLIAM H. SHORT, *Examiners.*